United States Patent
Folco et al.

(10) Patent No.: US 10,725,805 B2
(45) Date of Patent: Jul. 28, 2020

(54) PROVISIONING BASED ON WORKLOAD DISPLACEMENT

(71) Applicant: International Business Machines Corporation, Armonk, NY (US)

(72) Inventors: Rafael C. S. Folco, Santa Barbara d'Oeste (BR); Breno H. Leitão, Campinas (BR); Tiago N. d. Santos, Araraquara (BR)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/952,212

(22) Filed: Nov. 25, 2015

(65) Prior Publication Data

US 2017/0147375 A1 May 25, 2017

(51) Int. Cl.
*G06F 3/06* (2006.01)
*G06F 9/455* (2018.01)

(52) U.S. Cl.
CPC ........ *G06F 9/45558* (2013.01); *G06F 3/0644* (2013.01); *G06F 3/0673* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| 5,619,696 | A | * | 4/1997 | Nakagawa | .......... G06F 9/44521 718/100 |
| 6,513,153 | B1 | * | 1/2003 | Lee | ........................ G06F 9/4806 717/100 |
| 6,854,115 | B1 | * | 2/2005 | Traversat | .............. G06F 11/203 711/113 |

(Continued)

FOREIGN PATENT DOCUMENTS

CN 102222014 B 5/2013

OTHER PUBLICATIONS

Folco et al., "Provisioning Based on Workload Displacement," U.S. Appl. No. 15/267,643, filed Sep. 16, 2016.

(Continued)

*Primary Examiner* — Lewis A Bullock, Jr.
*Assistant Examiner* — Bruce S Ashley
(74) *Attorney, Agent, or Firm* — Kelsey M. Skodje

(57) ABSTRACT

A method, system, and computer program product are disclosed for creating an in-memory application image. Embodiments can include receiving an application from a storage. Embodiments can also include loading the received application into a memory storage pool. Embodiments can also include receiving an indication of a request to execute the in-memory application image on a first virtual machine of a plurality of virtual machines. Embodiments can also include receiving an indication to execute the in-memory application image on the first virtual machine. Embodiments can also include removing the in-memory application image from the memory storage pool, in response to the receiving (Continued)

the indication to execute the in-memory application. Embodiments can also include assigning the removed in-memory application image to the first virtual machine.

6 Claims, 7 Drawing Sheets

(56) References Cited

U.S. PATENT DOCUMENTS

| | | | |
|---|---|---|---|
| 7,500,040 B2 | 3/2009 | Gupta et al. | |
| 8,156,502 B1* | 4/2012 | Blanding | G06F 9/50 |
| | | | 718/100 |
| 8,429,322 B2 | 4/2013 | Tsirkin | |
| 8,949,364 B2* | 2/2015 | Miloushev | G06F 9/485 |
| | | | 709/212 |
| 9,466,036 B1* | 10/2016 | Vicaire | G06F 9/5027 |
| 9,691,118 B2* | 6/2017 | Harper | G06T 1/20 |
| 2004/0054780 A1* | 3/2004 | Romero | H04L 41/5025 |
| | | | 709/226 |
| 2005/0005018 A1* | 1/2005 | Datta | G06F 9/5016 |
| | | | 709/229 |
| 2005/0268301 A1* | 12/2005 | Kelley | G06F 9/4843 |
| | | | 718/100 |
| 2011/0153903 A1 | 6/2011 | Hinkle et al. | |
| 2011/0191442 A1* | 8/2011 | Ovsiannikov | H04L 63/0272 |
| | | | 709/218 |
| 2012/0102252 A1 | 4/2012 | Tsirkin | |
| 2012/0174096 A1 | 7/2012 | Conover | |
| 2012/0185855 A1 | 7/2012 | Cervantes et al. | |
| 2012/0191929 A1* | 7/2012 | Zietzke | G06F 9/45533 |
| | | | 711/162 |
| 2012/0297360 A1 | 11/2012 | Lucco et al. | |
| 2013/0300655 A1* | 11/2013 | Cameron | G06F 9/461 |
| | | | 345/157 |
| 2014/0082612 A1 | 3/2014 | Breitgand et al. | |

OTHER PUBLICATIONS

List of IBM Patents or Patent Applications Treated as Related, signed Sep. 15, 2016, 2 pages.

Huang et al., "Minimizing Latency in Fetching Virtual Machine Images Based on Multi-Point Collaborative Approach," 2013 IEEE International Conference on Green Computing and Communications and IEEE Internet of Things in IEEE Cyber, Physical and Social Computing, Aug. 2013, pp. 262-267, IEEE. DOI: 10.1109/GreenCom-iThings-CPSCom.2013.62.

Mell et al., "The NIST Definition of Cloud Computing: Recommendations of the National Institute of Standards and Technology," NIST Special Publication 800-145, Sep. 2011, 7 pages, National Institute of Standards and Technology, Gaithersburg, MD.

* cited by examiner

PROVISIONING BASED ON WORKLOAD DISPLACEMENT

BACKGROUND

The present disclosure relates to provisioning memory on virtual machines, and more specifically relates to provisioning memory on virtual machines based on workload displacement.

A virtual machine (VM) is generally an operating system or application environment that is installed on software, which imitates dedicated hardware. VMs provisioned in a cloud system may be treated as independent resources. Consequently, the same application may be started on multiple VMs, meaning that the same bits are being read from the disk, causing unnecessary latency and disk usage.

SUMMARY

According to embodiments of the present disclosure, a method, system, and computer program product are disclosed for creating an in-memory application image. Embodiments of the method, system, and computer program product can include receiving an application from a storage. Embodiments can also include loading the received application into a memory storage pool. Embodiments can also include receiving an indication of a request to execute the in-memory application image on a first virtual machine of a plurality of virtual machines. Embodiments can also include receiving an indication to execute the in-memory application image on the first virtual machine. Embodiments can also include removing the in-memory application image from the memory storage pool, in response to the receiving the indication to execute the in-memory application. Embodiments can also include assigning the removed in-memory application image to the first virtual machine.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
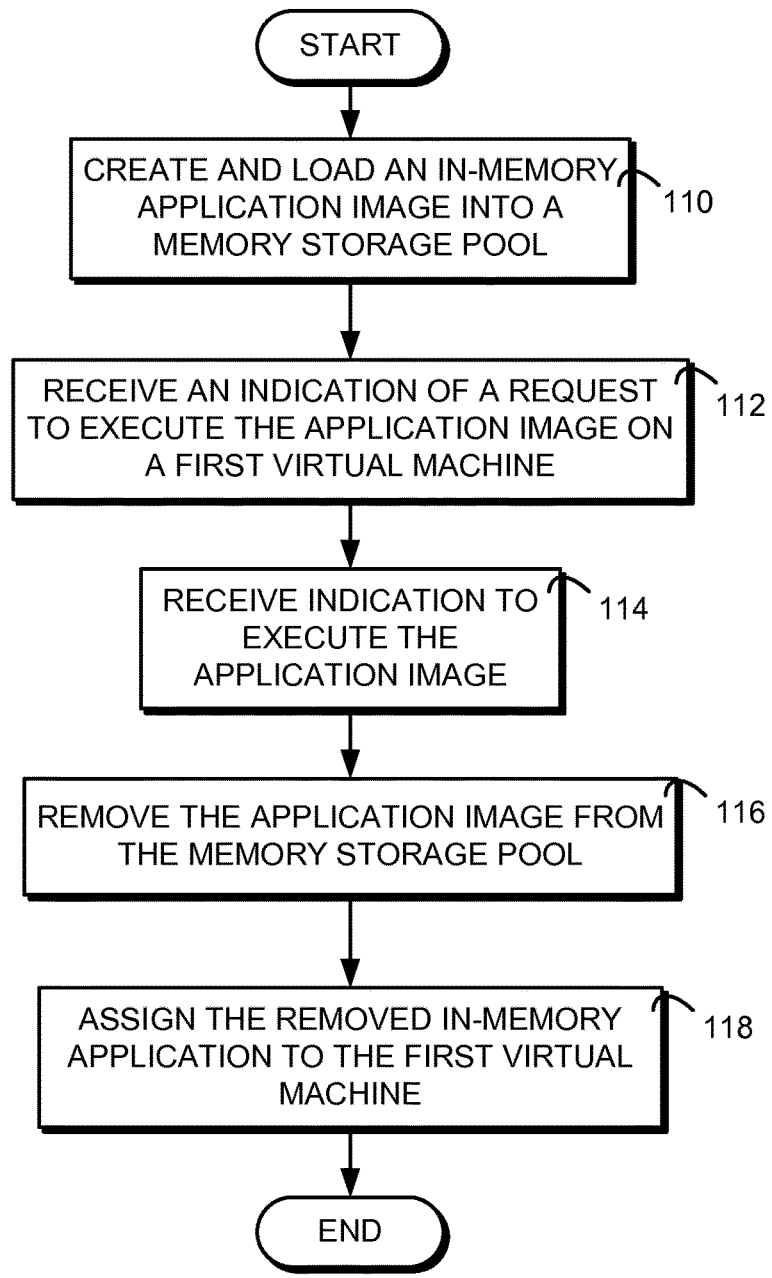
FIG. 1 depicts a flowchart for a method of provisioning memory in a virtual machine environment, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to virtual machines, and more specifically to provisioning memory on virtual machines (VMs) based on workload displacement. While the present disclosure is not necessarily limited to such applications, various aspects of the disclosure may be appreciated through a discussion of various examples using this context.

Embodiments of this disclosure include allocation of hypervisor memory based on the workload of a hypervisor, a pool of memory on a hypervisor containing applications previously instantiated, and on-demand allocation of applications from the hypervisor memory to VM memory via hot plugging. According to various embodiments, a memory "hot plug" or "hot add" allows adding or allocating memory resources to a VM while the VM remains powered on, uninterrupted.

Disclosed embodiments include dynamic memory management methods based on memory hot plug on VMs. In various embodiments, load time for applications may be reduced, disk (storage) access during the critical boot time may be reduced, and allocation may occur using seamless memory hot plugging.

According to various embodiments, a web portal may be utilized by millions of users. The web portal may run within a cloud computing environment, according to various embodiments. The web portal may utilize several VMs serving content through an application, for example, Apache (Apache HTTP Server) or open-source database management system (e.g., MySQL) web servers, according to various embodiments. As a result of the several VMs serving content for one application, an operating system (OS) may need to repeat various actions, including loading and placing the application from a disk into a memory every time a new VM is instantiated. Once loaded, the OS may start the application.

In the OS context, the described process may be called "memory-mapping" a file, which may include loading the bits (i.e., binary) of the application into memory. Currently, in the context of virtualized environments, the same process is often repeated among multiple different VMs if the same application (e.g., an Apache web server) is loaded into multiple different VMs in a hypervisor. Various embodiments of this disclosure include utilizing workload displacements across different memory spaces that could be plugged into the VM through the network, instead of reading directly from a disk.

According to one embodiment, if a given VM wants to start an HTTPd (Hypertext transfer protocol daemon) server, a block of memory on a hypervisor could be plugged into a VM instead of reading the binaries from the disks. This may allow faster access than loading and bootstrapping (booting) the code, which may contain an application. The code may be composed of bits, according to various embodiments.

According to various embodiments, HTTPd may refer to a software program that runs in the background of a web server and waits for incoming server requests. The daemon may answer a request automatically and may serve hypertext and/or multimedia documents using hypertext transfer protocol (HTTP).

In a cloud environment, for example, the same virtual images may be used on all deployments, including loading from the same source, according to various embodiments. The binaries may be created to work within a particular VM. The binaries may be created for a single VM image in order to ensure that a guest OS will have all required libraries for a given binary.

The binary of an application (or a part of an application) may be loaded if that application is requested or required, but may not be loaded every time in some embodiments, in order to save computing resources, among other reasons. The loading may occur from a memory or storage to a cache, which may be controlled by or hosted by a hypervisor. As a result, performance may be improved as the hypervisor may use a cache that can host the binaries for all VMs that are to be used, instead of loading for every VM that needs that part of binary.

FIG. 1 depicts a flowchart 100 for a method of provisioning memory in a virtual machine environment, according to various embodiments.

A process may begin, and a hypervisor may host various VMs in memory, according to various embodiments. At operation 110, an in-memory application image may be created by receiving an application from a storage. The storage may be a cache, memory (e.g., non-volatile or static random access memory), hard disk drive, solid-state drive, or other storage used to store previously loaded application(s), according to various embodiments. According to various embodiments, the hypervisor may utilize various algorithms to maintain a pool of potential application instances. The hypervisor may check, for example, whether an application is supposed to run on any of the VMs, for example if the hypervisor receives a request indicating that the application is requested to run on a VM. The hypervisor may also determine whether an application instance is available in the storage, and may load it in a memory storage pool. The loading may occur by transferring or copying the application instance, according to various embodiments. The memory storage pool may be real or virtual, and may be hosted on the hypervisor and may be created from memory bits in VM memory, depending on VM utilization and the hypervisor.

At operation 112, an indication of a request to execute the in-memory application image on a first virtual machine of a plurality of virtual machines may be received. According to various embodiments, the indication of the request may trigger various actions or responses from a hypervisor. The first virtual machine may be hosted by a hypervisor, according to various embodiments.

At operation 114, an indication to execute the in-memory application image on the first virtual machine may be received, according to various embodiments. The indication to execute may be in response to the indication of the request to execute of operation 112.

At operation 116, the in-memory application image may be removed (e.g., hot plugged or hot removed) from the memory storage pool, in response to the receiving the indication to execute the in-memory application. The removing may occur by removing or changing virtual memory addresses, which store or link to the application image.

At operation 118, the removed in-memory application image may be assigned to the first virtual machine. Assigning, as used herein, may include changing or setting links to various blocks of memory. According to various embodiments, the loading may include loading the application before a request to run the application is received, where the loading utilizes a probabilistic function to determine whether and/or when to load the application. According to other embodiments, the loading the received application may occur preemptively by loading the received application into the memory storage pool to adjust or improve performance before an actual request is made and/or received by a hypervisor or other controller. The preemptive loading may occur by loading the application before a direct request to run the application is received, and the adjusting of performance may utilize a probabilistic function to determine when to load the application, according to various embodiments. Predictive modeling may be utilized in order to select an application to load, along with where and when to load the application.

Figure 2:
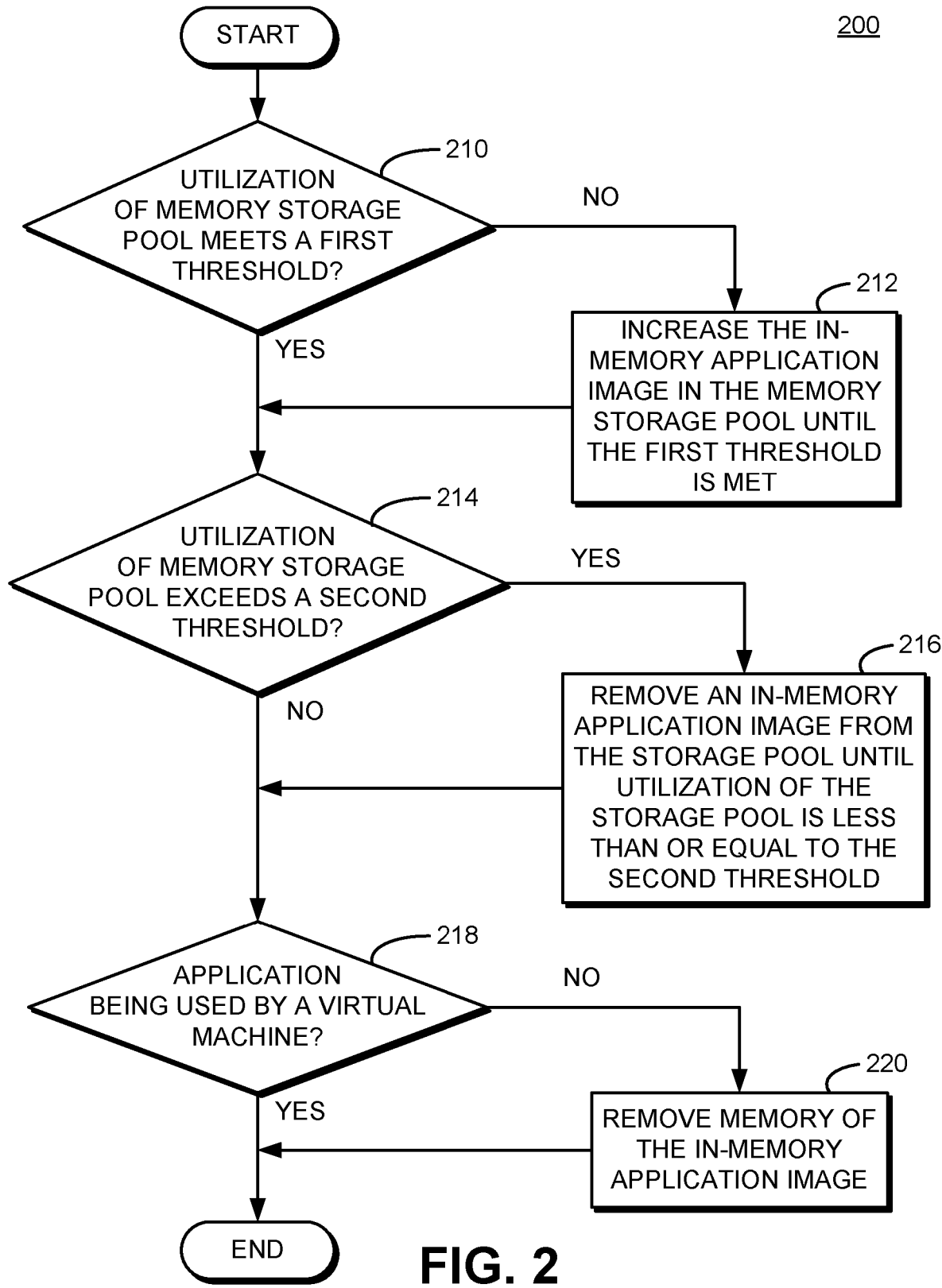
FIG. 2 depicts a flowchart for a method of adding or removing memory in a virtual machine environment, according to various embodiments.

FIG. 2 depicts a flowchart 200 for a method of adding or removing memory in a virtual machine environment, according to various embodiments.

At decision block 210, it may be determined whether the utilization of the memory storage pool meets a first threshold. The first threshold may be a minimal threshold required to run an application, according to various embodiments. A hypervisor may do the determining, according to various embodiments.

At operation 212, in response to the utilization of the memory storage pool not meeting the first threshold, the in-memory application image in the memory storage pool may be increased (e.g., by cloning) by a hypervisor until the first (e.g., minimal) threshold is met. A first threshold may be defined by the amount and quality of usage of the memory storage pool, according to various embodiments. The hypervisor may check at various intervals whether the first threshold is still valid, and may check again for a new threshold, and the hypervisor may continue increasing or cloning the image memory until the new threshold is met.

At decision block 214, it may be determined whether the utilization of the memory storage pool exceeds a second threshold. The second threshold may be a maximal threshold required to run one or more applications, according to various embodiments. A maximal (or second) threshold may be a maximum amount of memory allocated to the memory storage pool, where the maximum is defined as the most memory that is needed to run various applications. The hypervisor may proceed by checking the memory storage pool and determining if the maximal (e.g., second) threshold is not exceeded. If the second threshold is exceeded, then a hypervisor may remove the instantiated amount of images (e.g., memory blocks) that exceed the second threshold, according to various embodiments. The hypervisor may check whether the maximal threshold is still current at various intervals, and may adjust removals of application images as needed.

At operation 216, in response to a determination that utilization of the storage pool exceeds the second threshold, an in-memory application image may be removed from the storage pool until utilization of the storage pool is less than or equal to the second threshold.

At decision block 218, a hypervisor may determine whether the in-memory application image is being used by a virtual machine of the plurality of virtual machines. The determining whether any virtual machine of the plurality of virtual machines is utilizing the application may occur at a predetermined interval. In other words, the hypervisor may check whether the application is currently running. If the application is not currently running, the hypervisor may proceed by hot removing the memory blocks assigned to the VM running the application and assigning the memory blocks to the memory storage pool. If a VM no longer uses the application, or if the application is otherwise not in use, the hypervisor may be alerted that the application is no longer is use.

At operation 220, in response to the determining, memory of the in-memory application image may be removed, wherein the memory removed is returned to the memory storage pool. The removing uses hot plugging or hot removing, according to various embodiments.

Figure 3:
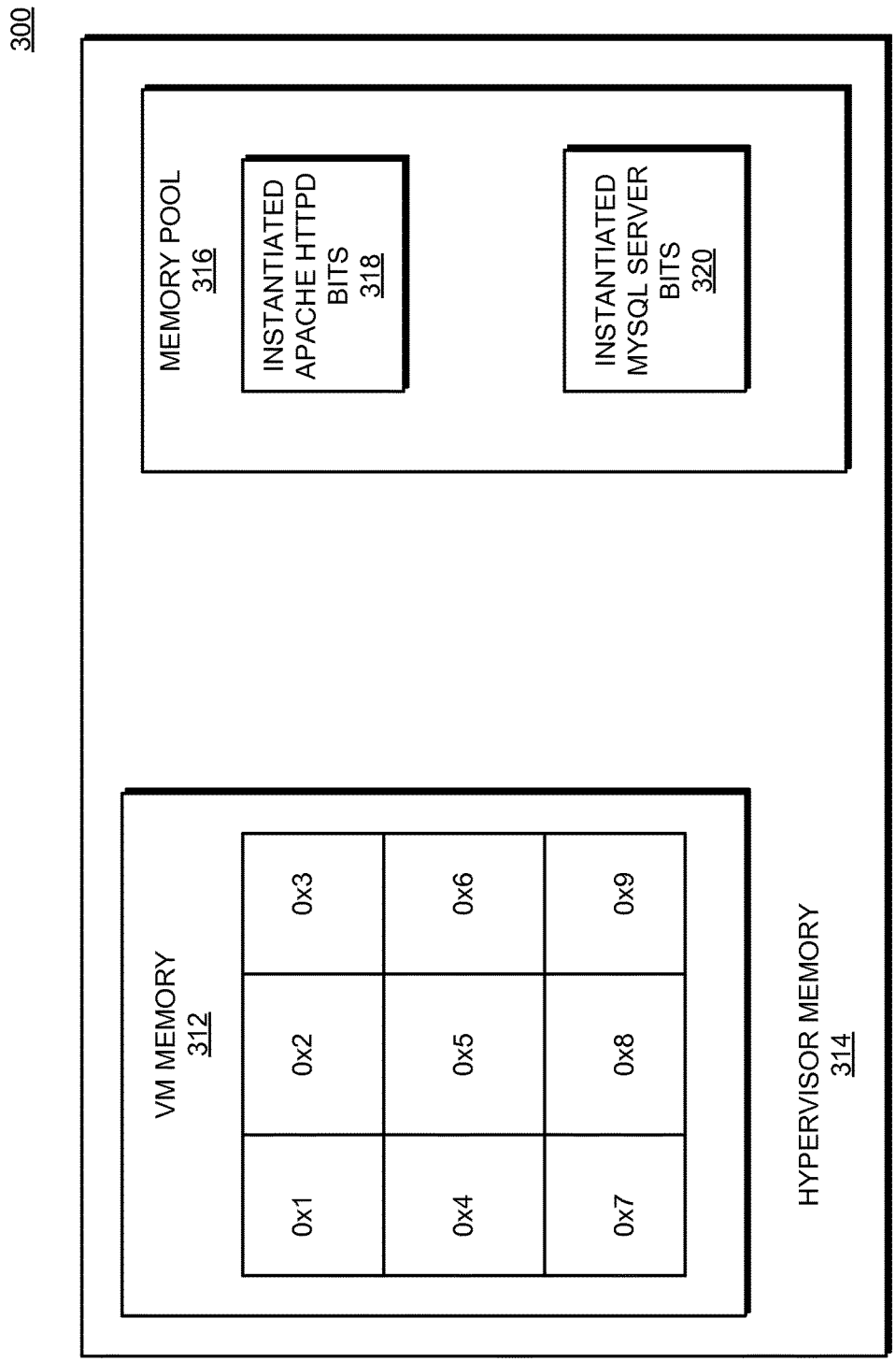
FIG. 3 depicts a visual representation of an example hypervisor memory with virtual machine memory provisioning thereon, according to various embodiments.

FIG. 3 depicts a visual representation 300 of an example hypervisor memory with virtual machine memory provisioning thereon, according to various embodiments.

According to various embodiments, an environment schema of instantiated application "blocks" may be utilized when VMs are instantiated, but before loading the workload applications. The application blocks may be represented as 0x1 through 0x9, which may represent addresses within memory.

A VM memory may be hosted on a hypervisor memory 314 at 312. A process may include creating memory bits and saving them as a file in a hypervisor (not shown). If the hypervisor is aware that the VM (or VM images) are going to use an application that has the bits in a disk, the application bits may be loaded to the hypervisor memory 314, according to various embodiments.

A memory pool is shown at 316, also referred to as a "memory storage pool." The hypervisor may keep the binary loaded in the memory storage pool until a VM requests it. The memory storage pool 316 may include various types of memory, including a cache, or non-volatile memory, among others, according to various embodiments. There may be a limit on those resources and a policy to unload the unused blocks, according to various embodiments. A cache mechanism may handle various algorithms, including, but not limited to: frequently used, last-used, and/or unload algorithms.

At 318 are example bits of an instantiated first application, which may include an HTTP server or application, and/or Apache HTTPd application bits. At 320 are example bits of an instantiated second application, MySQL server application bits. MySQL may also include MariaDB or other database server, according to various embodiments. Various embodiments may include more or fewer applications, and the applications may be similar or diverse in nature, according to various embodiments.

Figure 4:
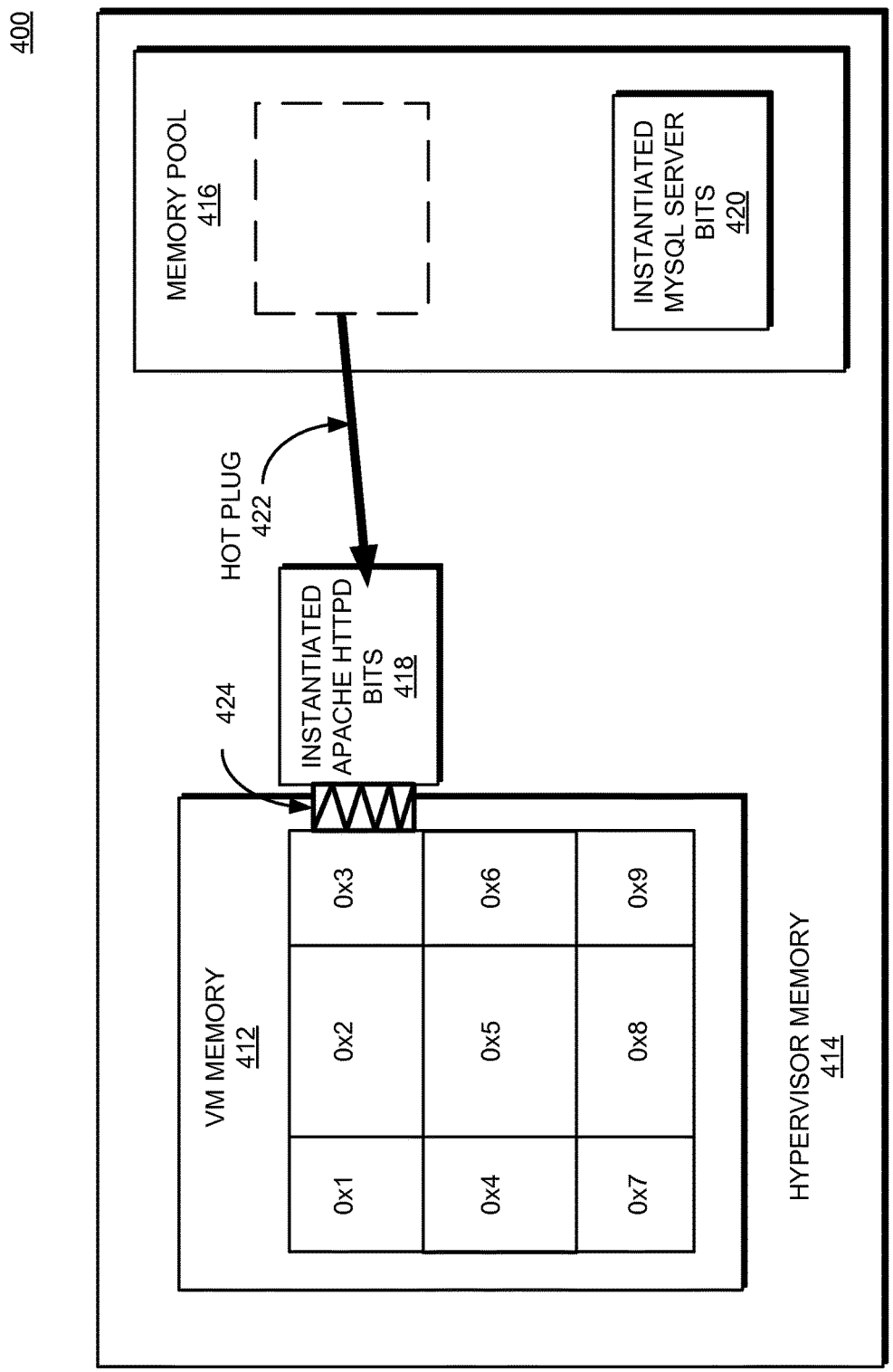
FIG. 4 depicts a visual representation of an example hypervisor with virtual machine memory provisioned to an application in virtual machine memory, according to various embodiments.

FIG. 4 depicts a visual representation 400 of an example hypervisor with virtual machine memory provisioned to an application in virtual machine memory, according to various embodiments.

At 412, a VM memory is shown. VM memory 412 may be similar to VM memory 312, according to various embodiments. At 414 is a hypervisor memory, which may be similar to hypervisor memory 314, according to various embodiments. At 416 is a memory pool, also referred to as a "memory storage pool," which may be similar to memory pool 316, according to various embodiments.

Shown at 418 are example bits of an instantiated first application, apache HTTPd application bits. Instantiated first application 418 may be similar to 318, according to various embodiments.

At 420 are example bits of an instantiated second application, MYSQL server application bits. Instantiated second application 420 may be similar to 320, according to various embodiments.

At 422 an operation may occur by which the instantiated Apache HTTPd bits 418 are hot plugged into one of the VM memory 412 cells.

Once the VM wants to start an application, one of the memory blocks from the pool 416 is assigned from the memory storage pool into the VM memory 412, via hot plug 422. Then, the VM may point to that new memory block and may start (i.e., execute) the application without directly reading from the disk, which would be a resource-intensive process.

For each VM that wants to load and/or run an application, the hypervisor may hot remove the application memory block from the memory storage pool 416 and assign it to that VM via hot plug. If the VM is currently not using the application memory, the hypervisor may then hot remove the application memory (e.g., the memory that stores the bits for the application) from the VM (or VM image) and return the memory to the memory storage pool.

At 424, the instantiated Apache HTTPd bits 418 are shown loaded (e.g., hot plugged) into the VM memory 412 (e.g., into memory block 0x3) as a result of the hot plug operation 422. According to various embodiments, plugged-in instantiated blocks on the hypervisor VM memory 412 are shown.

A memory block from the pool may be assigned from the memory storage pool into the VM memory via hot plug, and the VM may point to the new memory block and start the application without reading from disk.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the computing resources of the provider are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in various quantities at various times.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software-as-a-Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform-as-a-Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure-as-a-Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (e.g., private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 5:
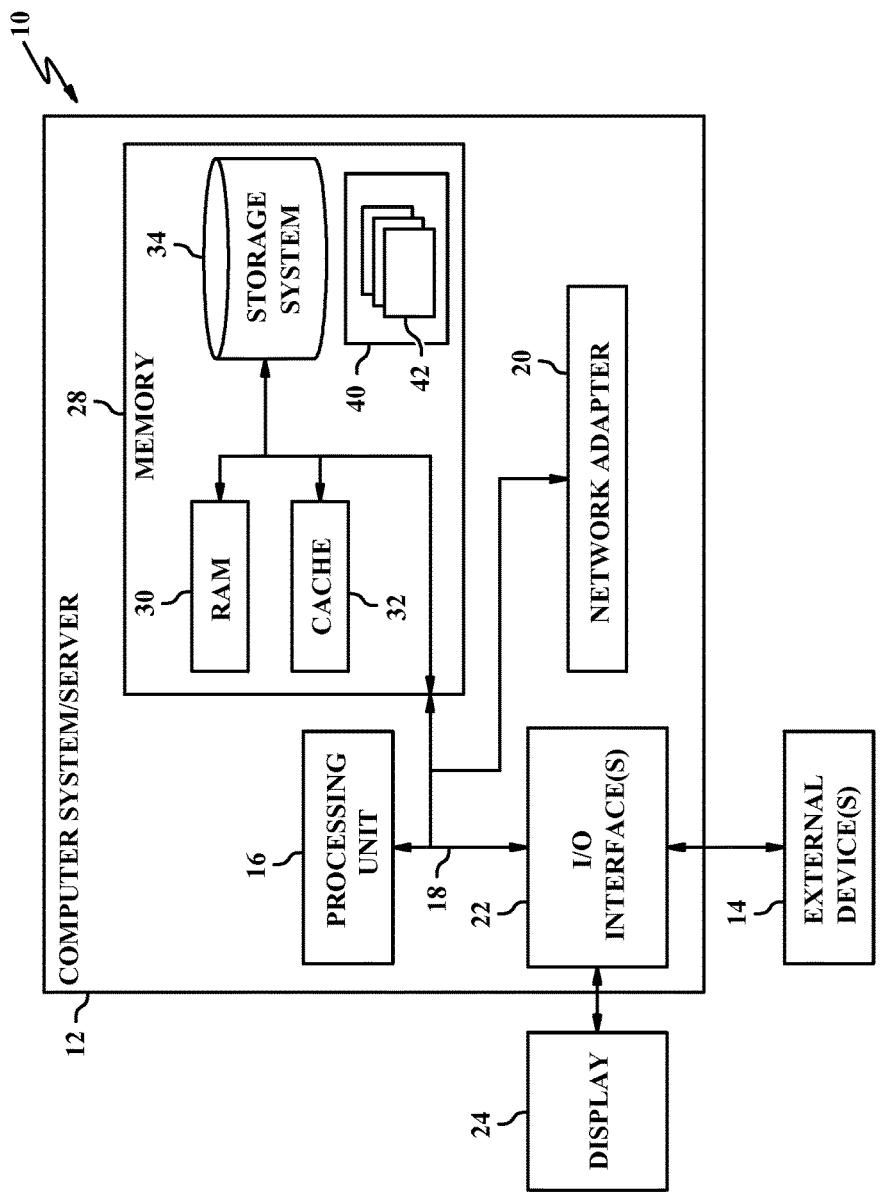
FIG. 5 depicts a schematic of an example of a cloud computing node, according to various embodiments.

FIG. 5 depicts a schematic of an example of a cloud computing node, according to various embodiments.

Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
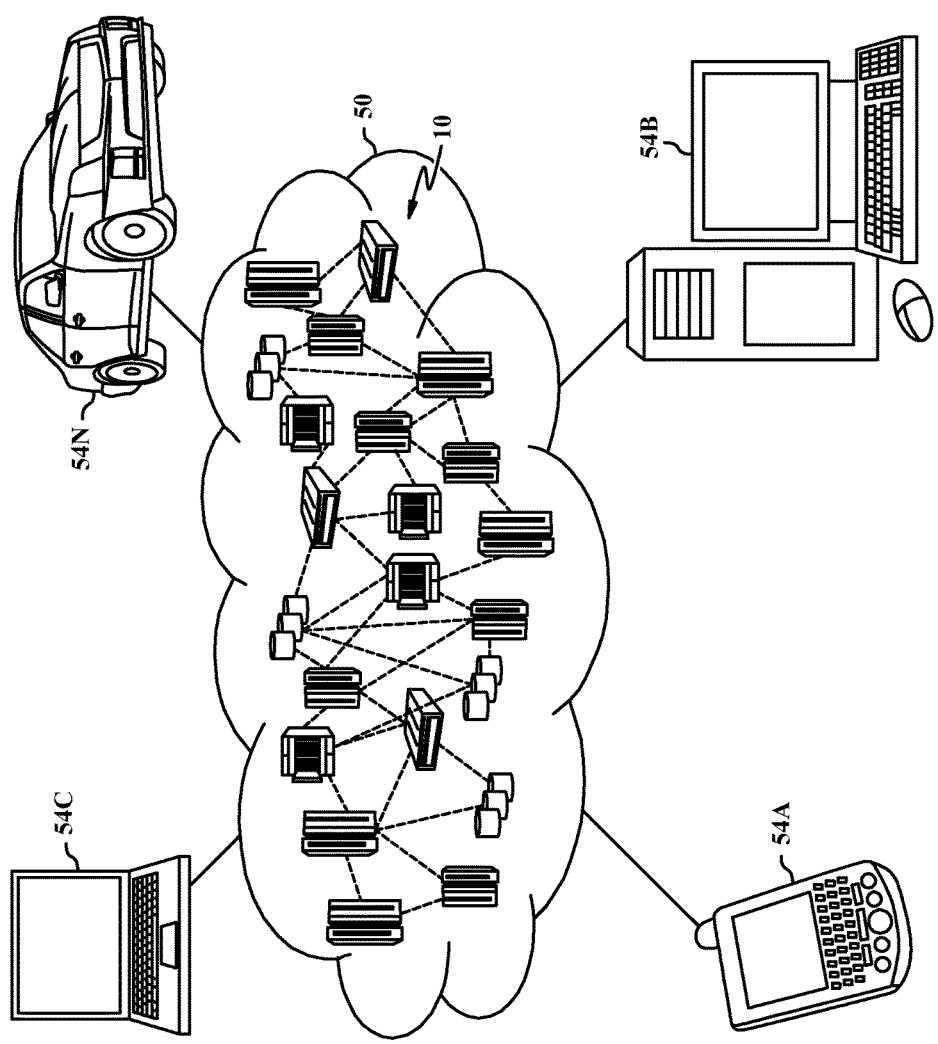
FIG. 6 depicts an illustrative cloud computing environment, according to various embodiments.

FIG. 6 depicts an illustrative cloud computing environment, according to various embodiments.

As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
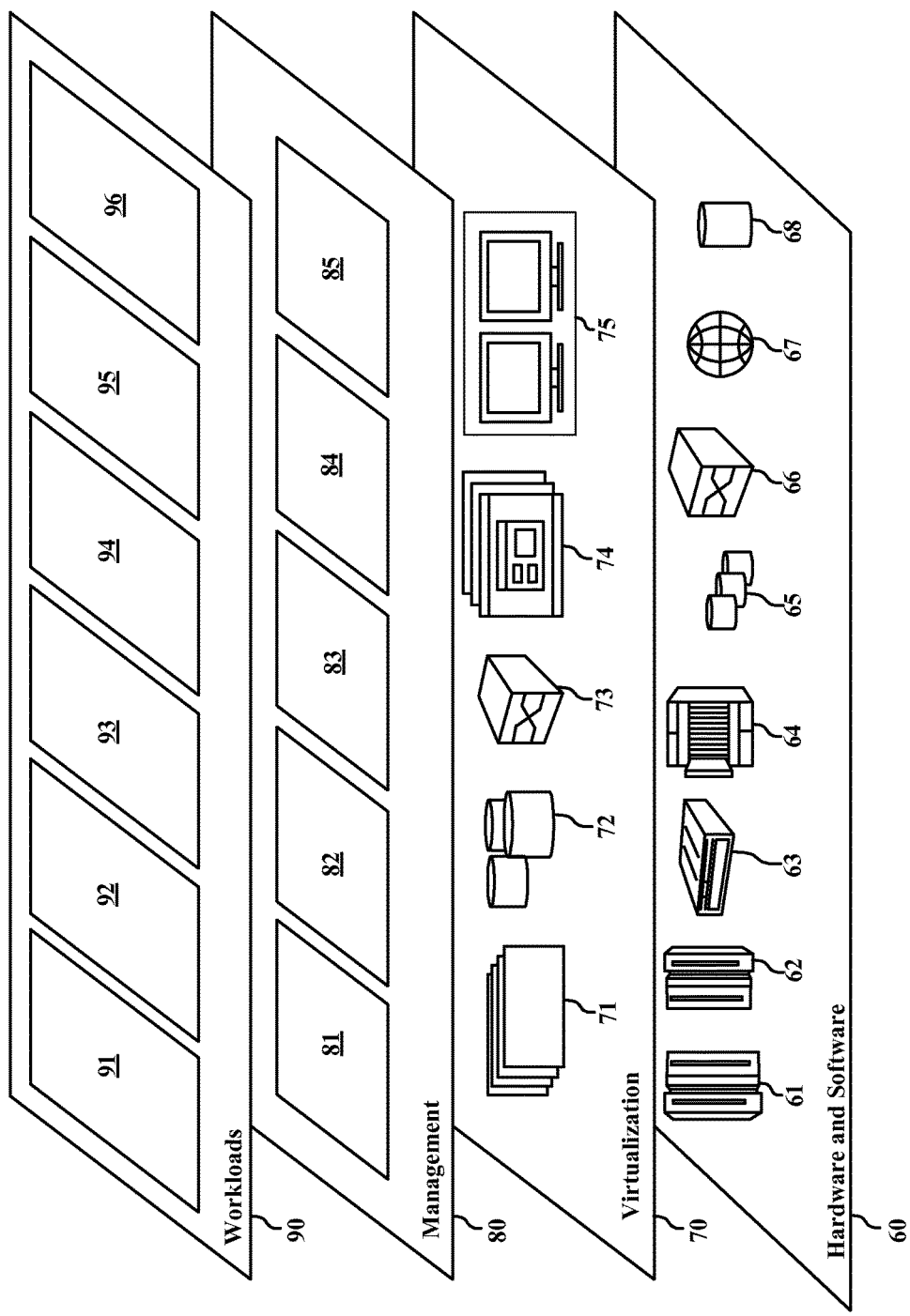
FIG. 7 depicts a set of functional abstraction layers provided by a cloud computing environment, according to various embodiments.

FIG. 7 depicts a set of functional abstraction layers provided by a cloud computing environment (e.g., as depicted in FIG. 6), according to various embodiments.

It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions, which may be provided from this layer, include mapping and navigation 91; software development and lifecycle management 92; virtual classroom education delivery 93; data analytics processing 94; transaction processing 95; and mobile desktops 96.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system, comprising:
a processor coupled to a system memory, wherein the processor is configured to:
determine, by a probabilistic function, that an application from one or more non-volatile storage devices is supposed to run on at least one virtual machine from a plurality of virtual machines;
create an in-memory application image for the application by loading the application into a volatile memory storage pool, the volatile memory storage pool being hosted on a hypervisor;
clone the in-memory application image until at least an amount of the memory storage pool utilization meets a first threshold amount of memory storage pool utilization, wherein the first threshold amount is a minimum amount of memory storage pool utilization required to run the in-memory application image on the at least one virtual machine;

receive a first request to execute the in-memory application image on at least one virtual machine of the plurality of virtual machines without reading from the one or more non-volatile storage devices;

determine that utilization of the volatile memory storage pool does not meet a first threshold amount of memory storage pool utilization, wherein the first threshold amount is a minimum amount of memory storage pool utilization required to run the in-memory application image on the one or more virtual machines;

in response to the determining that the first threshold amount is unmet, clone the in-memory application image until it is determined that the first threshold amount has been met;

remove at least a cloned in-memory application image from the volatile memory storage pool in response to the receiving the at least one request to execute the in-memory application image on the one or more virtual machines;

hot adding the removed cloned in-memory application image from the volatile memory storage pool into a virtual machine memory of the first virtual machine, wherein the hot adding includes changing a pointer position of the first virtual machine to point from a location in the volatile memory storage pool to a new location in one or more blocks of the virtual machine memory such that the cloned in-memory application image is no longer accessible in the volatile memory storage pool while the first virtual machine is executing the cloned in-memory application image;

determine that the utilization of the volatile memory storage pool exceeds a second threshold amount of volatile memory storage pool utilization, wherein the second threshold amount is a maximum amount of volatile memory storage pool utilization needed to run the in-memory application image;

in response to the determining that second threshold amount is exceeded, hot removing an amount of the cloned in-memory application images in the volatile memory storage pool until it is determined that the amount of volatile memory storage pool utilization is at or below the second threshold amount; and repeatedly adjusting at predetermined intervals, by hot adding when the first threshold amount is not met and by hot removing when the second threshold amount is exceeded.

2. The system of claim 1, further comprising determining, by a hypervisor, that a virtual machine of the one or more virtual machines is not currently running, and in response to the determining by the hypervisor, hot removing one or more memory blocks assigned to the virtual machine and assigning the one or more memory blocks back to the memory storage pool.

3. The system of claim 1, wherein the loading includes loading the application before a request to run the application is received, wherein the loading utilizes the probabilistic function to determine when to load the application.

4. A computer-readable program product for provisioning based on workload displacement, the computer program product comprising a computer readable storage medium having program instructions embodied therewith, the program instructions executable by a computer to cause the computer to perform a method comprising:

determining, by a probabilistic function, that an application from one or more non-volatile storage devices is supposed to run on at least one virtual machine from a plurality of virtual machines;

creating an in-memory application image for the application by loading the application into a volatile memory storage pool, the volatile memory storage pool being hosted on a hypervisor;

cloning the in-memory application image until at least an amount of the memory storage pool utilization meets a first threshold amount of memory storage pool utilization, wherein the first threshold amount is a minimum amount of memory storage pool utilization required to run the in-memory application image on the at least one virtual machine;

receiving a first request to execute the in-memory application image on at least one virtual machine of the plurality of virtual machines without reading from the one or more non-volatile storage devices;

determining that utilization of the volatile memory storage pool does not meet a first threshold amount of memory storage pool utilization, wherein the first threshold amount is a minimum amount of memory storage pool utilization required to run the in-memory application image on the one or more virtual machines;

in response to the determining that the first threshold amount is unmet, clone the in-memory application image until it is determined that the first threshold amount has been met;

removing at least a cloned in-memory application image from the volatile memory storage pool in response to the receiving the at least one request to execute the in-memory application image on the one or more virtual machines;

hot adding the removed cloned in-memory application image from the volatile memory storage pool into a virtual machine memory of the first virtual machine, wherein the hot adding includes changing a pointer position of the first virtual machine to point from a location in the volatile memory storage pool to a new location in one or more blocks of the virtual machine memory such that the cloned in-memory application image is no longer accessible in the volatile memory storage pool while the first virtual machine is executing the cloned in-memory application image;

determining that the utilization of the volatile memory storage pool exceeds a second threshold amount of volatile memory storage pool utilization, wherein the second threshold amount is a maximum amount of volatile memory storage pool utilization needed to run the in-memory application image;

in response to the determining that second threshold amount is exceeded, hot removing an amount of the cloned in-memory application images in the volatile memory storage pool until it is determined that the amount of volatile memory storage pool utilization is at or below the second threshold amount; and repeatedly adjusting at predetermined intervals, by hot adding when the first threshold amount is not met and by hot removing when the second threshold amount is exceeded.

5. The computer-readable program product of claim 4, wherein it is determined whether any virtual machine of the plurality of virtual machines is utilizing the application at a predetermined interval.

6. The computer-readable program product of claim 4, wherein the loading includes loading the application before a request to run the application is received, wherein the loading utilizes the probabilistic function to determine when to load the application.

* * * * *